(12) United States Patent
Yoo et al.

(10) Patent No.: US 9,834,645 B2
(45) Date of Patent: Dec. 5, 2017

(54) THERMOPLASTIC RESIN COMPOSITION AND THERMOPLASTIC RESIN MOLDED ARTICLE PREPARED THEREFROM

(71) Applicant: LG CHEM, LTD., Seoul (KR)

(72) Inventors: Keun Hoon Yoo, Daejeon (KR); Jeong Su Choi, Daejeon (KR); Won Seok Lee, Daejeon (KR); Seok Goo Jang, Daejeon (KR); Roo Da Lee, Daejeon (KR); Sang Hoo Park, Daejeon (KR); Ho Hoon Kim, Daejeon (KR)

(73) Assignee: LG CHEM, LTD., Seoul (KR)

( * ) Notice: Subject to any disclaimer, the term of this patent is extended or adjusted under 35 U.S.C. 154(b) by 0 days.

(21) Appl. No.: 14/911,455

(22) PCT Filed: Jul. 23, 2015

(86) PCT No.: PCT/KR2015/007696
§ 371 (c)(1),
(2) Date: Feb. 10, 2016

(87) PCT Pub. No.: WO2016/043424
PCT Pub. Date: Mar. 24, 2016

(65) Prior Publication Data
US 2017/0183455 A1  Jun. 29, 2017

(30) Foreign Application Priority Data

Sep. 16, 2014 (KR) .................. 10-2014-0122822
Jul. 23, 2015 (KR) .................. 10-2015-0104270

(51) Int. Cl.
*C08L 51/04* (2006.01)
*C08G 81/02* (2006.01)
*C08J 5/00* (2006.01)

(52) U.S. Cl.
CPC ......... *C08G 81/024* (2013.01); *C08G 81/027* (2013.01); *C08J 5/00* (2013.01); *C08L 51/04* (2013.01)

(58) Field of Classification Search
None
See application file for complete search history.

(56) References Cited

U.S. PATENT DOCUMENTS

| 4,767,833 A * | 8/1988 | Yumoto ............... C08F 279/02 525/193 |
|---|---|---|
| 7,019,049 B1 | 3/2006 | Yoo et al. |
| 2001/0016620 A1 | 8/2001 | Itoh et al. |
| 2003/0040582 A1 | 2/2003 | Braga et al. |
| 2008/0073624 A1 | 3/2008 | Choi et al. |
| 2009/0043047 A1 | 2/2009 | Ha et al. |
| 2009/0156719 A1 | 6/2009 | Jin et al. |
| 2013/0274416 A1 | 10/2013 | Choi et al. |
| 2013/0281603 A1 | 10/2013 | Jin et al. |
| 2014/0142212 A1 | 5/2014 | Chu et al. |
| 2016/0002455 A1 | 1/2016 | Chung et al. |

FOREIGN PATENT DOCUMENTS

| CN | 1312322 A | 9/2001 |
|---|---|---|
| CN | 101506300 A | 8/2009 |
| CN | 103180383 A | 6/2013 |
| JP | 2003-528960 A | 9/2003 |
| KR | 10-0189393 B1 | 1/1999 |
| KR | 102002-0003484 A | 1/2002 |
| KR | 10-2007-0108008 A | 11/2007 |
| KR | 10-2012-0071941 A | 7/2012 |
| KR | 10-2012-0078583 A | 7/2012 |
| KR | 10-2012-0088090 A | 8/2012 |
| KR | 10-2013-0046162 A | 5/2013 |
| KR | 10-2014-0005510 A | 1/2014 |

OTHER PUBLICATIONS

Extended European Search Report for European Application No. 15826125.5 dated Apr. 10, 2017.

* cited by examiner

*Primary Examiner* — Jeffrey Mullis

(57) ABSTRACT

Provided are a thermoplastic resin composition having high environmental stress crack resistance (ESCR) as well as excellent impact resistance and transparency and a thermoplastic resin molded article prepared therefrom. The thermoplastic resin composition includes a graft copolymer (A), in which a (meth)acrylic acid ester, a vinyl cyan-based compound, and an aromatic vinyl compound are graft polymerized with a conjugated diene-based rubber latex; and a copolymer (B) of a (meth)acrylic acid ester-aromatic vinyl compound-vinyl cyan-based compound in a weight ratio of 35:65 to 70:30. A difference in refractive indices of the graft copolymer (A) and the copolymer (B) of the (meth)acrylic acid ester-aromatic vinyl compound-vinyl cyan-based compound is less than 0.003 when irradiated with light having a wavelength of 450 nm to 680 nm, and a melt index is 4.0 g/10 min or less when the melt index is measured in accordance with ASTM D1238.

19 Claims, No Drawings

THERMOPLASTIC RESIN COMPOSITION AND THERMOPLASTIC RESIN MOLDED ARTICLE PREPARED THEREFROM

TECHNICAL FIELD

Cross-Reference to Related Applications

This application is a U.S. National Stage of International Patent Application No. PCT/KR2015/007696, filed Jul. 23, 2015, which claims the benefit of Korean Patent Application Nos. 2014-0122822, filed on Sep. 16, 2014, and 2015-0104270, filed on Jul. 23, 2015, in the Korean Intellectual Property Office, the disclosures of which are incorporated herein in their entirety by reference.

Technical Field

The present invention relates to a thermoplastic resin composition having high environmental stress crack resistance (ESCR) as well as excellent impact resistance and transparency and a thermoplastic resin molded article prepared therefrom.

BACKGROUND ART

Typically, excellent impact resistance, excellent transparency, and good environmental stress crack resistance (ESCR, chemical resistance), such as resistance to alcohol and resistance to oil, are required for a material used in the manufacture of medical products. As such medical material, a polyvinyl chloride (PVC)-based resin, a polycarbonate (PC) resin, an acrylonitrile-butadiene-styrene (ABS) resin, a polymethylmethacrylate (PMMA) resin, a polystyrene (PS) resin, or a styrene-acrylonitrile (SAN) resin has been mainly used.

Among these resins, since the PVC-based resin has excellent transparency and chemical resistance as well as excellent flame retardancy, the PVC-based resin has been mainly used in medical products such as needle hubs, patient connectors, and urine containers. However, with respect to the polyvinyl chloride-based resin, since the use of a plasticizer is essentially required, there are human safety issues due to the migration of the plasticizer.

Also, since the polycarbonate resin has excellent transparency and impact resistance but has low ESCR (chemical resistance), cracks may occur due to the effects of residual molding stress when in contact with a cleaner.

Furthermore, since the acrylonitrile-butadiene-styrene (ABS) resin includes an acrylonitrile compound, the ABS resin has excellent ESCR (chemical resistance). However, since the ABS resin is opaque, there is a limitation in using the ABS resin in medical products requiring transparency.

Although the polymethylmethacrylate (PMMA) resin, the polystyrene (PS) resin, and the styrene-acrylonitrile (SAN) resin have excellent transparency, ESCR with respect to alcohol is poor and impact strength is not sufficiently high. Also, since the PS resin and the SAN resin have low impact strength, there is a limitation in using the PS and SAN resins in medical products requiring high environmental stress crack resistance (chemical resistance), impact resistance, and transparency.

Thus, there is a need to develop a resin having high environmental stress crack resistance (chemical resistance) as well as excellent impact resistance and transparency.

DISCLOSURE OF THE INVENTION

Technical Problem

The present invention provides a thermoplastic resin composition having high environmental stress crack resistance (ESCR) due to a low melt index as well as excellent impact resistance and transparency.

The present invention also provides a thermoplastic resin molded article prepared from the above-described thermoplastic resin composition.

Technical Solution

According to an aspect of the present invention, there is provided a thermoplastic resin composition including a graft copolymer (A), in which a (meth)acrylic acid ester, a vinyl cyan-based compound, and an aromatic vinyl compound are graft polymerized with a conjugated diene-based rubber latex; and a copolymer (B) of a (meth)acrylic acid ester-aromatic vinyl compound-vinyl cyan-based compound in a weight ratio of 35:65 to 70:30, wherein a difference in refractive indices of the graft copolymer (A) and the copolymer (B) of the (meth)acrylic acid ester-aromatic vinyl compound-vinyl cyan-based compound is less than 0.003 when irradiated with light having a wavelength of 450 nm to 680 nm, and a melt index is 4.0 g/10 min or less when the melt index is measured in accordance with ASTM D1238.

According to another aspect of the present invention, there is provided a thermoplastic resin composition including a graft copolymer (MABS), in which methyl methacrylate, acrylonitrile, and styrene are graft polymerized with a conjugated diene-based rubber latex; and a methyl methacrylate-styrene-acrylonitrile copolymer (MSAN) in a weight ratio of 35:65 to 70:30, wherein the conjugated diene-based rubber latex is included in an amount of 20 wt % to 35 wt % based on a total weight of the composition, a difference in refractive indices of the graft copolymer and the methyl methacrylate-styrene-acrylonitrile copolymer is less than 0.003 when irradiated with light having a wavelength of 450 nm to 680 nm, the graft copolymer is prepared by graft polymerization of the methyl methacrylate, the acrylonitrile, and the styrene with the conjugated diene-based rubber latex using a chain transfer agent, the methyl methacrylate, the acrylonitrile, and the styrene are used in a weight ratio of 20:2:8 to 40:10:15, and the chain transfer agent is used in an amount of 0.05 part by weight to 0.4 part by weight based on 100 parts by weight of a total sum of the conjugated diene-based rubber latex and monomers grafted with the conjugated diene-based rubber latex.

According to another aspect of the present invention, there is provided a thermoplastic resin molded article prepared from the above thermoplastic resin composition.

Advantageous Effects

Since a thermoplastic resin composition according to the present invention has a low melt index as well as excellent impact resistance and transparency, the thermoplastic resin composition may exhibit high environmental stress crack resistance (ESCR).

Thus, the thermoplastic resin composition is suitable for a material for products requiring high ESCR (chemical resistance) as well as excellent impact resistance and transparency, particularly, a material for medical products.

MODE FOR CARRYING OUT THE INVENTION

Hereinafter, the present invention will be described in more detail to allow for a clearer understanding of the present invention.

It will be understood that words or terms used in the specification and claims shall not be interpreted as the meaning defined in commonly used dictionaries. It will be further understood that the words or terms should be interpreted as having a meaning that is consistent with their meaning in the context of the relevant art and the technical idea of the invention, based on the principle that an inventor may properly define the meaning of the words or terms to best explain the invention.

A method of introducing an acrylic acid alkyl ester or a methacrylic acid alkyl ester compound has been implemented in order to provide transparency to an acrylonitrile-butadiene-styrene resin having low transparency. However, the above method has a limitation in using the acrylonitrile-butadiene-styrene resin in medical products because environmental stress crack resistance is reduced due to the introduced (meth)acrylic acid alkyl ester. In order to obtain characteristics suitable to medical products by introducing the (meth)acrylic acid alkyl ester into the acrylonitrile-butadiene-styrene resin, a modulus in a finally polymerized resin may be appropriately adjusted and, for this purpose, the adjustment of the ratio of each component to be mixed may act as an important factor.

Thus, in the present invention, a graft copolymer, in which a (meth)acrylic acid ester, a vinyl cyan-based compound, and an aromatic vinyl compound are graft polymerized with a conjugated diene-based rubber latex, and a copolymer of a (meth)acrylic acid ester-aromatic vinyl compound-vinyl cyan-based compound, which have a similar refractive index, are mixed and used, but an amount and a mixing ratio of each component are optimized, and thus, a thermoplastic resin composition having high environmental stress crack resistance (ESCR) due to a low melt index as well as excellent impact resistance and transparency may be provided.

Specifically, a thermoplastic resin composition according to an embodiment of the present invention includes a graft copolymer (A), in which a (meth)acrylic acid ester, a vinyl cyan-based compound, and an aromatic vinyl compound are graft polymerized with a conjugated diene-based rubber latex; and a copolymer (B) of a (meth)acrylic acid ester-aromatic vinyl compound-vinyl cyan-based compound in a weight ratio of 35:65 to 70:30, wherein a difference in refractive indices of the graft copolymer (A) and the copolymer (B) of the (meth)acrylic acid ester-aromatic vinyl compound-vinyl cyan-based compound is less than 0.003, and a melt index (MI) is 4.0 g/10 min or less when the melt index is measured in accordance with ASTM D1238.

In the present invention, the expression "refractive index" denotes an absolute refractive index of a material (e.g., monomer or polymer), wherein the refractive index is recognized as a ratio of the speed of radiation in the material to the speed of electromagnetic radiation in free space and, in this case, the radiation is visible light having a wavelength of 450 nm to 680 nm. The refractive index may be generally measured by a known method, i.e., using an Abbe refractometer.

Also, a refractive index of a graft copolymer may be calculated according to the following Equation 1 using a refractive index and an amount of each polymer constituting the graft copolymer:

$$RI = \Sigma(Wti \times RIi) \quad \text{[Equation 1]}$$

In Equation 1, Wti is a weight fraction (%) of each component (or polymer) in the graft copolymer, and RIi is the refractive index of the graft copolymer forming polymer.

Hereinafter, the present invention will be described in more detail.

A) Graft Copolymer

In the thermoplastic resin composition according to the embodiment of the present invention, the graft copolymer, as a copolymer in which a (meth)acrylic acid ester, a vinyl cyan-based compound, and an aromatic vinyl compound are graft polymerized with a conjugated diene-based rubber latex, may have a core-shell structure including a core of the grafted conjugated diene-based rubber latex; and a shell including the (meth)acrylic acid ester, vinyl cyan-based compound, and aromatic vinyl compound which are grafted onto the core.

Type and amount of monomer compounds constituting the graft copolymer may be appropriately determined under conditions such that the difference in the refractive indices of the graft copolymer (A) and the copolymer (B) of the (meth)acrylic acid ester-aromatic vinyl compound-vinyl cyan-based compound is less than 0.003. Specifically, the graft copolymer may be a copolymer in which 45 wt % to 75 wt % of the conjugated diene-based rubber latex core; and 25 wt % to 55 wt % of the shell including the (meth)acrylic acid ester, vinyl cyan-based compound, and aromatic vinyl compound on the core are grafted. In this case, the shell may respectively include the (meth)acrylic acid ester, the vinyl cyan-based compound, and the aromatic vinyl compound in amounts of 20 to 40 parts by weight, 2 to 10 parts by weight, and 8 to 15 parts by weight, i.e., in a weight ratio of 20:2:8 to 40:10:15. In a case in which the shell includes the (meth)acrylic acid ester, the vinyl cyan-based compound, and the aromatic vinyl compound within the above weight ratio range, particularly, the shell includes the vinyl cyan-based compound within the above ratio range, the melt index (MI) of a thermoplastic resin is reduced, and, as a result, the environmental stress crack resistance may be significantly improved.

Also, in the graft copolymer, the conjugated diene-based rubber latex core may have an average particle diameter of 2,000 Å to 5,000 Å, a gel content of 70 wt % to 95 wt %, and a swelling index of 12 to 30.

Furthermore, in the graft copolymer, transparency of the graft copolymer may be improved by controlling a refractive index of the conjugated diene-based rubber latex core to be similar to a refractive index of the shell including the (meth)acrylic acid ester, vinyl cyan-based compound, and aromatic vinyl compound to be described later. Specifically, a difference in the refractive indices of the conjugated diene-based rubber latex core and the shell including the (meth)acrylic acid ester, vinyl cyan-based compound, and aromatic vinyl compound may be less than 0.003.

In the graft copolymer, the conjugated diene-based rubber latex may include a conjugated diene-based compound homopolymer, or a copolymer of a conjugated diene-based compound and an ethylene-based unsaturated compound, and the conjugated diene-based compound may be at least one selected from the group consisting of 1,3-butadiene, 2-ethyl-1,3-butadiene, isoprene, chloroprene, and 1,3-pentadiene. Also, the ethylene-based unsaturated compound may include an ethylenically unsaturated nitrile compound, an ethylenically unsaturated acid compound, or a mixture thereof, and, for example, may include at least one selected from the group consisting of acrylonitrile, methacrylonitrile, α-chloronitrile, styrene, alkyl styrene, vinyl naphthalene, chloroethyl vinyl ether, (meth)acrylamide, dibutyl maleate, dibutyl fumarate, or diethyl maleate.

Particularly, the conjugated diene-based rubber latex may include at least one selected from the group consisting of a butadiene homopolymer, an isoprene homopolymer, a butadiene-styrene copolymer, a butadiene-acrylonitrile copolymer, and an isobutylene-isoprene copolymer. More particularly, the conjugated diene-based rubber latex may be a butadiene homopolymer.

Also, in the graft copolymer, the (meth)acrylic acid ester is meant to include an acrylic acid ester and a methacrylic acid ester.

Specifically, the (meth)acrylic acid ester may include at least one selected from the group consisting of an acrylic acid alkyl ester and a methacrylic acid alky ester.

The acrylic acid alkyl ester may include at least one selected from the group consisting of methyl acrylate, ethyl acrylate, propyl acrylate, butyl acrylate, hexyl acrylate, and 2-ethylhexyl acrylate, and, for example, may be methyl acrylate.

The methacrylic acid alkyl ester may include at least one selected from the group consisting of methyl methacrylate, ethyl methacrylate, propyl methacrylate, butyl methacrylate, hexyl methacrylate, and 2-ethylhexyl methacrylate, and, for example, may be methyl methacrylate.

In the graft copolymer, the vinyl cyan-based compound may include at least one selected from the group consisting of acrylonitrile, methacrylonitrile, and derivatives thereof, and may specifically be acrylonitrile.

Also, in the graft copolymer, the aromatic vinyl compound may include at least one selected from the group consisting of styrene, α-methyl styrene, vinyl toluene, alkyl styrene substituted with a $C_{1-3}$ alkyl group (e.g., o-methylstyrene, m-methylstyrene, p-methylstyrene, or p-ethylstyrene), and halogen-substituted styrene, and may specifically be styrene.

Furthermore, the graft copolymer may have a weight-average molecular weight (Mw) of 130,000 g/mol to 300,000 g/mol. When the graft copolymer has the above weight-average molecular weight range, the melt index of the thermoplastic resin composition may be reduced to exhibit better environmental stress crack resistance. Typically, a weight-average molecular weight of a polymer may be a polystyrene-equivalent molecular weight analyzed by gel permeation chromatography (GPC), but, with respect to a rubber, it is difficult to measure an accurate weight-average molecular weight. Accordingly, in the present invention, the weight-average molecular weight of the graft copolymer may be calculated from the melt index, rubber content, and amount of vinyl cyan-based compound-derived structural unit of the copolymer.

For example, the graft copolymer may be a methyl methacrylate-acrylonitrile-butadiene-styrene copolymer (MABS) in which methyl methacrylate, acrylonitrile, and styrene are graft polymerized with a butadiene rubber latex, and for example, may be a MABS satisfying the above-described weight-average molecular weight and molecular weight distribution.

Specifically, the graft copolymer may be prepared by a preparation method, in which a (meth)acrylic acid ester, a vinyl cyan-based compound, and an aromatic vinyl compound are graft polymerized with a conjugated diene-based rubber latex using a chain transfer agent.

In this case, the (meth)acrylic acid ester, the vinyl cyan-based compound, and the aromatic vinyl compound are the same as previously described.

Also, the chain transfer agent is for controlling the molecular weight of the prepared graft copolymer, wherein the chain transfer agent may be used in an amount of 0.05 part by weight to 0.4 part by weight based on 100 parts by weight of a total weight of the conjugated diene-based rubber latex and monomers grafted with the conjugated diene-based rubber latex. In a case in which the amount of the chain transfer agent used is outside the above range, i.e., excessively small or excessively large, the molecular weight of the prepared graft copolymer may be excessively low to reduce chemical resistance or the molecular weight of the prepared graft copolymer may be excessively high to reduce formability. Type of the chain transfer agent is not particularly limited, but may include mercaptans. Specific examples of the mercaptans may be at least one selected from the group consisting of n-butylmercaptan, n-octylmercaptan, n-dodecylmercaptan, and t-dodecylmercaptan.

The conjugated diene-based rubber latex core is not particularly limited and may be prepared by a typical method known in the art. Specifically, at least one additive, such as ion exchange water, an emulsifier, a polymerization initiator, an electrolyte, or a chain transfer agent, is selectively added to a conjugated diene-based compound or a mixture of a conjugated diene-based compound and an ethylene-based unsaturated compound, and emulsion polymerization is then preformed to prepare a large diameter conjugated diene-based rubber latex (direct polymerization); or a small diameter conjugated diene-based rubber latex is prepared by the emulsion polymerization (step 1), and a fusion process may then be performed to prepare a large diameter conjugated diene-based rubber latex core (step 2) (agglomeration polymerization).

For example, in a case in which the conjugated diene-based rubber latex core is prepared through the direct polymerization, the direct polymerization may be performed by collectively adding 70 parts by weight to 120 parts by weight of ion exchange water, 0.2 part by weight to 2.5 parts by weight of an emulsifier, 0.1 part by weight to 1.5 parts by weight of a polymerization initiator, 0.5 part by weight to 2 parts by weight of an electrolyte, and 0.1 part by weight to 1 part by weight of a chain transfer agent based on 100 parts by weight of a conjugated diene-based compound or a mixture of a conjugated diene-based compound and an ethylene-based unsaturated compound to a polymerization reactor and reacting at a temperature of 50° C. to 90° C. In this case, the conjugated diene-based compound, the ethylene-based unsaturated compound, and the chain transfer agent may be the same as the materials previously described or may be included therein.

Also, the polymerization initiator is not particularly limited, but, for example, a water-soluble persulfate-based polymerization initiator, such as potassium persulfate, sodium persulfate, or ammonium persulfate, and a redox-based polymerization initiator including a peroxide, such as hydrogen peroxide, cumene hydroperoxide, diisopropylbenzene hydroperoxide, t-butyl hydroperoxide, or paramenthane hydroperoxide, as one component may be used alone or in a mixture thereof.

The emulsifier is not particularly limited, but, for example, one selected from the group consisting of an alkyl aryl sulfonate, an alkali methyl alkyl sulfate, a sulfonated alkyl ester, a soap of fatty acid, and an alkali salt of rosinate, or a mixture of two or more thereof may be used.

The electrolyte is not particularly limited, but, for example, one selected from the group consisting of potassium chloride (KCl), sodium chloride (NaCl), potassium bicarbonate ($KHCO_3$), sodium bicarbonate ($NaHCO_3$), potassium carbonate ($K_2CO_3$), sodium carbonate ($Na_2CO_3$), potassium bisulfate ($KHSO_3$), sodium bisulfate ($NaHSO_3$), tetrapotassium pyrophosphate ($K_4P_2O_7$), tetrasodium pyrophosphate ($Na_4P_2O_7$), tripotassium phosphate ($K_3PO_4$), trisodium phosphate ($Na_3PO_4$), dipotassium phosphate ($K_2HPO_4$), and disodium phosphate ($Na_2HPO_4$), or a mixture of two or more thereof may be used.

As described above, the conjugated diene-based rubber latex prepared by the direct polymerization may have an average particle diameter of 2,000 Å to 5,000 Å, a gel content of 70 wt % to 95 wt %, and a swelling index of 12 to 30. In this case, the average particle diameter was measured by a dynamic laser light scattering method (Laser Scattering Analyzer, Nicomp 370 HPL), wherein the expression "Å" denotes a unit of length which is typically used to express a wavelength of electromagnetic radiation, and 1 Å is equivalent to 0.1 nm.

Methanol was added to the prepared conjugated diene-based rubber latex, precipitation was performed using sulfuric acid, and precipitates were cleaned and dried at 60° C. for 24 hours in a vacuum oven to obtain a lump of rubber. Then, 1 g of a rubber section (A) was cut from the lump of rubber, put in a 100 g of toluene, and stored in a dark room at room temperature for 48 hours. Then, the solution was separated into a sol and a gel, and the gel content (wt %) and the swelling index were obtained by Equations 2 and 3 below.

$$\text{Gel content }(wt\ \%) = \frac{\text{weight of insoluble (gel)}}{\text{weight of initial rubber selection}} \times 100 \quad \text{[Equation 2]}$$

$$\text{Swelling index} = \frac{\text{weight of gel after swelling}}{\text{weight of gel before swelling}} \quad \text{[Equation 3]}$$

Also, in a case in which the conjugated diene-based rubber latex core is prepared through the agglomeration polymerization, the agglomeration polymerization may be performed through steps 1 and 2 to be described later.

Step 1 is a step of performing emulsion polymerization to prepare a small diameter conjugated diene-based rubber latex, wherein the emulsion polymerization is not particularly limited and may be performed by a typical method known in the art. Specifically, the emulsion polymerization may be performed by a method including: collectively adding 90 parts by weight to 130 parts by weight of ion exchange water, 1 part by weight to 4 parts by weight of an emulsifier, 0.1 part by weight to 0.6 part by weight of a polymerization initiator, 0.1 part by weight to 1.0 part by weight of an electrolyte, and 0.1 part by weight to 0.5 part by weight of a chain transfer agent based on 100 parts by weight of a conjugated diene-based compound or a mixture of a conjugated diene-based compound and an ethylene-based unsaturated compound to a polymerization reactor and primarily reacting at a temperature of 50° C. to 65° C. for 7 hours to 12 hours, further collectively adding 0.05 part by weight to 1.2 parts by weight of the chain transfer agent to the polymerization reactor after the primary reaction, and increasing the temperature to 55° C. to 70° C. to perform a reaction for 5 hours to 15 hours. In this case, the conjugated diene-based compound, the ethylene-based unsaturated compound, the emulsifier, the polymerization initiator, the electrolyte, and the chain transfer agent may be the same as the materials previously described or may be included therein.

The small diameter conjugated diene-based rubber latex prepared by step 1 may have an average particle diameter of 600 Å to 1,500 Å, a gel content of 70 wt % to 95 wt %, and a swelling index of 12 to 30. In this case, the average particle diameter, the gel content, and the swelling index may be obtained by the same method previously described.

Step 2 is a step of performing a fusion process to prepare a large diameter conjugated diene-based rubber latex from the prepared small diameter conjugated diene-based rubber latex, wherein the fusion process is not particularly limited and may be performed by a typical method known in the art. For example, the fusion process may be performed by enlarging the small diameter conjugated diene-based rubber latex particles by gradually and continuously adding 2.0 parts by weight to 4.0 parts by weight of an acetic acid aqueous solution (5% to 10% concentration) to a reactor filled with 100 parts by weight of the small diameter conjugated diene-based rubber latex for 1 hour while stirring, then adding potassium hydroxide to neutralize, and stopping the stirring.

The prepared large diameter conjugated diene-based rubber latex may have the average particle diameter, gel content, and swelling index as described above.

Next, the shell including the (meth)acrylic acid ester, vinyl cyan-based compound, and aromatic vinyl compound may be formed on the conjugated diene-based rubber latex core by selectively mixing the (meth)acrylic acid ester, vinyl cyan-based compound, and aromatic vinyl compound with at least one additive, such as an emulsifier, a polymerization initiator, or a chain transfer agent, and performing graft polymerization on the prepared conjugated diene-based rubber latex core.

Specifically, the shell may be formed on the conjugated diene-based rubber latex core by adding 25 wt % to 55 wt % of a monomer mixture constituting the shell including the (meth)acrylic acid ester, vinyl cyan-based compound, and aromatic vinyl compound and 0.05 part by weight to 0.4 part by weight of a chain transfer agent, 0.1 part by weight to 0.5 part by weight of an emulsifier, and 0.05 part by weight to 0.3 part by weight of a polymerization initiator based on 100 parts by weight of the core and monomer mixture to a polymerization reactor filled with 45 wt % to 75 wt % of the conjugated diene-based rubber latex core, and performing copolymerization at a temperature of 50° C. to 80° C. for 3 hours to 6 hours. In this case, the monomer mixture constituting the shell may include the (meth)acrylic acid ester, the vinyl cyan-based compound, and the aromatic vinyl compound at a weight ratio of 20:2:8 to 40:10:15 as described above. Also, since the chain transfer agent is used within the above range, appropriate chemical resistance as well as excellent formability may be obtained as described above.

After the polymerization process, processes for agglomeration, cleaning, and drying may be further performed. For example, an antioxidant and a stabilizer are added to the reactor after the completion of the polymerization, calcium chloride, a magnesium sulfate aqueous solution, or a sulfuric acid aqueous solution are added at a temperature of 80° C. or more to perform agglomeration, and a graft copolymer in a powder state may then be obtained by dehydrating and drying the agglomerates.

The (meth)acrylic acid ester, the vinyl cyan-based compound, the aromatic vinyl compound, and the additives, such as the chain transfer agent, the emulsifier, and the polymerization initiator, which are used to prepare the shell, may be the same as the materials previously described or may be included therein.

Also, the above-described materials may be collectively added, or all or a portion of the materials may be continuously (sequentially) added. Furthermore, the collective addition and continuous addition may be appropriately adjusted to be used in combination.

The graft copolymer according to the present invention may have a solid coagulum content of less than 0.5 wt %. The solid coagulum content is an indicator representing latex stability of a graft copolymer, wherein, since the latex stability is significantly reduced when the solid coagulum content is 0.5 wt % or more, desired properties may be difficult to be obtained.

In this case, the solid coagulation content may be calculated by the following Equation 4.

$$\text{Solid coagulum content (wt \%)} = \frac{\text{weight of coagulum produced in reactor}}{\text{weight of total rubber and monomer used in the reaction}} \times 100 \quad \text{[Equation 4]}$$

B) Copolymer of (Meth)Acrylic Acid Ester-Aromatic Vinyl Compound-Vinyl Cyan-Based Compound The copolymer of the (meth)acrylic acid ester-aromatic vinyl compound-vinyl cyan-based compound according to an embodiment of the present invention is a copolymer of a (meth)acrylic acid ester, an aromatic vinyl compound, and a vinyl cyan-based compound, wherein the copolymer is not limited thereto, but may be a bulk polymer prepared by bulk polymerization.

Specifically, the copolymer of the (meth)acrylic acid ester-aromatic vinyl compound-vinyl cyan-based compound may be a bulk polymer including: 55 wt % to 70 wt % of a (meth)acrylic acid ester; 20 wt % to 30 wt % of an aromatic vinyl compound; and 2 wt % to 10 wt % of a vinyl cyan-based compound.

With respect to the copolymer of the (meth)acrylic acid ester-aromatic vinyl compound-vinyl cyan-based compound, in order to increase the transparency of the thermoplastic resin composition, a weight ratio of the (meth)acrylic acid ester, the aromatic vinyl compound, and the vinyl cyan-based compound may be adjusted so as to have a difference in the refractive indices of the above-described graft copolymer and the copolymer of the (meth)acrylic acid ester-aromatic vinyl compound-vinyl cyan-based compound of less than 0.003. Specifically, the weight ratio of the (meth)acrylic acid ester, the aromatic vinyl compound, and the vinyl cyan-based compound may be in a range of 55:20:2 to 70:30:10. In this case, the (meth)acrylic acid ester, the aromatic vinyl compound, and the vinyl cyan-based compound may be the same as the materials previously described or may be included therein.

Also, the copolymer of the (meth)acrylic acid ester-aromatic vinyl compound-vinyl cyan-based compound may have a weight-average molecular weight (Mw) of 130,000 g/mol to 300,000 g/mol. When the copolymer of the (meth)acrylic acid ester-aromatic vinyl compound-vinyl cyan-based compound has the above weight-average molecular weight range, the melt index of the thermoplastic resin composition may be reduced to have excellent environmental stress crack resistance. In the present invention, the weight-average molecular weight of the copolymer may be a polystyrene-equivalent molecular weight analyzed by gel permeation chromatography (GPC).

Particularly, the copolymer of the (meth)acrylic acid ester-aromatic vinyl compound-vinyl cyan-based compound may be a methyl methacrylate-styrene-acrylonitrile copolymer (MSAN), and, more particularly, may be a MSAN satisfying the above-described weight-average molecular weight and molecular weight distribution.

The copolymer of the (meth)acrylic acid ester-aromatic vinyl compound-vinyl cyan-based compound is not particularly limited and may be prepared by a typical method known in the art. For example, the copolymer of the (meth) acrylic acid ester-aromatic vinyl compound-vinyl cyan-based compound may be prepared by bulk polymerization of a (meth)acrylic acid ester, an aromatic vinyl compound, and a vinyl cyan-based compound. Specifically, the bulk polymerization may be performed by mixing 26 parts by weight to 30 parts by weight of a reaction medium and 0.05 part by weight to 0.5 part by weight of a chain transfer agent with 100 parts by weight of a monomer mixture including 55 wt % to 70 wt % of the (meth)acrylic acid ester, 20 wt % to 30 wt % of the aromatic vinyl compound, and 2 wt % to 10 wt % of the vinyl cyan-based compound, performing a reaction for 2 hours to 4 hours while maintaining a temperature of 140° C. to 170° C. to prepare a polymer, and then removing an unreacted material and the reaction medium.

A typical organic solvent may be used as the reaction medium. Specifically, an aromatic hydrocarbon-based compound such as ethylbenzene, benzene, toluene, and xylene; a ketone-based compound such as methyl ethyl ketone and acetone; an aliphatic hydrocarbon-based compound such as n-hexane; a halogenated hydrocarbon-based compound such as chloroform; or a cycloaliphatic hydrocarbon-based compound, such as cyclohexane, may be used.

The bulk polymerization may be performed by further including an additive, such as a polymerization initiator and a chain transfer agent, in addition to the above-described materials such as the monomer mixture. The additive may be the same as the materials previously described or may be included therein.

Also, the bulk polymerization may be performed in a continuous processor composed of a raw material input pump, a continuous agitation tank, a preheating tank, an evaporation tank, a polymer transfer pump, and an extruder.

The thermoplastic resin composition according to the embodiment of the present invention may include the graft copolymer and the copolymer of the (meth)acrylic acid ester-aromatic vinyl compound-vinyl cyan-based compound as described above, wherein each copolymer may be included in a combination so that the difference in the refractive indices between the two copolymers becomes less than 0.003 by controlling the type and amount of monomers constituting each copolymer. In a case in which the difference in the refractive indices between the two copolymers is less than 0.003 or the two copolymers have the same refractive index, the transparency of the thermoplastic resin composition may be significantly improved. In this case, the refractive index of each of the graft copolymer and the copolymer of the (meth)acrylic acid ester-aromatic vinyl compound-vinyl cyan-based compound is not particularly limited, but the two copolymers may each have a refractive index of 1.515 to 1.521 in terms of a significant improvement in the transparency of the thermoplastic resin composition.

Also, the thermoplastic resin composition according to the embodiment of the present invention may include the graft copolymer and the copolymer of the (meth)acrylic acid ester-aromatic vinyl compound-vinyl cyan-based compound, which have the above-described difference in the refractive indices, at a weight ratio of 35:65 to 70:30, for example, 55:45 to 60:40. Since the two copolymers are included in an optimized weight ratio, the thermoplastic resin composition may have an appropriate modulus. Thus, the thermoplastic resin composition may exhibit excellent impact strength and environmental stress crack resistance.

Furthermore, the thermoplastic resin composition according to the embodiment of the present invention may include the conjugated diene-based rubber latex included in the graft copolymer in an amount of 20 wt % to 35 wt %, for example, 25 wt % to 35 wt %, based on a total weight of the thermoplastic resin composition. Since the conjugated diene-based rubber latex is included within the above range, the thermoplastic resin composition may have a significantly low melt index. As a result, the thermoplastic resin composition may exhibit improved environmental stress crack resistance.

A refractive index of the monomer mixture affects the transparency of the thermoplastic resin composition, and in this case, the refractive index may be adjusted by the amount of the monomer used and the mixing ratio. Specifically, in the thermoplastic resin composition according to the present invention, a refractive index of the butadiene constituting the rubber core of the graft copolymer is about 1.518. Accordingly, in order for the thermoplastic resin composition including the butadiene to have excellent transparency, it is desirable to adjust a refractive index of total components of the shell grafted onto the polybutadiene rubber core to the level similar thereto. For example, with respect to a refractive index of each component constituting the shell, the refractive indices of methyl methacrylate, styrene, and acrylonitrile are about 1.49, about 1.59, and about 1.518, respectively. Also, it is desirable to adjust a refractive index of the MSAN copolymer mixed with the graft copolymer to be similar to the refractive index of the graft copolymer for the improvement of the transparency of the thermoplastic resin composition. Simultaneously, in order to increase the ESCR of the thermoplastic resin composition, it is desirable to control the amount and molecular weight of the acrylonitrile. Also, the amount of the core rubber included in the thermoplastic resin composition affects the modulus of the thermoplastic resin composition, wherein, when the amount of the rubber is excessively small, the modulus may be increased to reduce the ESCR, and when the amount of the rubber is excessively large, the processability of the resin composition may be reduced.

Accordingly, in a thermoplastic resin composition according to another embodiment of the present invention, when considering a good balance between improvements in the impact resistance, transparency, and environmental stress crack resistance according to the control of a refractive index and a mixing ratio of a copolymer and the control of an amount of a conjugated diene-based rubber latex in a graft copolymer, the thermoplastic resin composition, for example, may include a graft copolymer in which methyl methacrylate, acrylonitrile, and styrene are graft polymerized with a conjugated diene-based rubber latex; and a methyl methacrylate-styrene-acrylonitrile copolymer in a weight ratio of 35:65 to 70:30, wherein the conjugated diene-based rubber latex is included in an amount of 20 wt % to 35 wt % based on a total weight of the composition and a difference in refractive indices of the graft copolymer and the methyl methacrylate-styrene-acrylonitrile copolymer may be less 0.003. In this case, the graft copolymer is prepared by graft polymerization of the methyl methacrylate, acrylonitrile, and styrene with the conjugated diene-based rubber latex using a chain transfer agent, wherein the methyl methacrylate, the acrylonitrile, and the styrene may be included in a weight ratio of 20:2:8 to 40:10:15 and the chain transfer agent may be included in an amount of 0.05 part by weight to 0.4 part by weight based on 100 parts by weight of a total sum of the conjugated diene-based rubber latex and monomers grafted with the conjugated diene-based rubber latex.

The thermoplastic resin composition according to the present invention may further include at least one additive, such as a lubricant, an antioxidant, and an ultraviolet stabilizer, in addition to the copolymer.

The lubricant is not particularly limited, but, for example, may include ethylene bis stearamide, an oxidized polyethylene wax, magnesium stearate, or a mixture thereof. An amount of the lubricant used may be in a range of 0.1 part by weight to 5 parts by weight, for example, 0.5 part by weight to 2 parts by weight, based on 100 parts by weight of the thermoplastic resin composition.

The antioxidant is not particularly limited, but, for example, may be a phenol-based antioxidant or a phosphate-based antioxidant, and may specifically be stearyl-$\beta$-(3,5-di-tert-butyl-4-hydroxyphenyl)propionate. An amount of the antioxidant used may be 0.5 part by weight to 2 parts by weight based on 100 parts by weight of the thermoplastic resin composition.

The ultraviolet stabilizer is not particularly limited and may be one typically used in the art. Specifically, the ultraviolet stabilizer may be 2(2'-hydroxy-3',5'-di-tert-butylphenyl)-5-chloro benzotriazole. An amount of the ultraviolet stabilizer used may be 0.05 part by weight to 3 parts by weight, for example, 0.2 part by weight to 1 part by weight, based on 100 parts by weight of the thermoplastic resin composition.

Since the thermoplastic resin composition according to the present invention having the above-described configuration has a low melt index as well as excellent impact resistance and transparency, and thus, the thermoplastic resin composition exhibits high environmental stress crack resistance (ESCR).

Specifically, the thermoplastic resin composition may have a haze after storing at 23° C. for 24 hours, which was measured in accordance with DIN 75201 method A, of 3.5% or less, and may have an impact strength of 20 kgf·cm/cm$^2$ to 30 kgf·cm/cm$^2$, in which the thermoplastic resin composition was prepared in the form of a pellet, a ¼" thick sample was prepared by injection molding at 230° C., and the impact strength of the sample was measured in accordance with ASTM D256 (¼", notched at 2317, kgf·cm/cm$^2$).

Also, the thermoplastic resin composition may have a melt index (MI) of 4.0 g/10 min or less, in which the thermoplastic resin composition was prepared in the form of a pellet and the MI was then determined as a result of measuring a weight (g) of the resin which is melted at a temperature of 220° C. for 10 minutes under a load of 10 kg in accordance with ASTM D1238.

In general, a melt index of a transparent MABS resin used for the injection of electrical/electronic products is in a range of about 10 g/10 min to about 50 g/10 min, and a melt index of a transparent MABS resin for extrusion used in a sheet is in a range of about 4.5 g/10 min to about 8 g/10 min. Also, in a case in which the melt index is greater than 4.0 g/10 min, since the molecular weight is insufficient, the environmental stress crack resistance of the thermoplastic resin may be reduced. The thermoplastic resin composition according to the present invention may have a melt index of 4 g/10 min or less, particularly, 3.5 g/10 min or less, and more particularly, 1 g/10 min or less to 3 g/10 min or less, and thus, may exhibit excellent environmental stress crack resistance during high shear test.

The melt index of the thermoplastic resin composition may be mainly determined by the amount of the vinyl cyan-based compound of the copolymer, the molecular weight of the copolymer, and the amount of the conjugated diene-based latex, and, in particular, may be greatly affected by the amount of the conjugated diene-based latex in the thermoplastic resin composition among the above factors. As described above, since the amount of the conjugated diene-based rubber latex in the thermoplastic resin composition according to the embodiment of the present invention is controlled to be in a range of 20 wt % to 35 wt %, for example, 25 wt % to 35 wt %, based on the total weight of the composition, the thermoplastic resin composition may have a melt index of 4.0 g/10 min or less which is significantly lower than a typical rubber composition for injection molding. Furthermore, since the amount of the vinyl cyan-based compound in each copolymer constituting the thermoplastic resin composition and the molecular weight of the copolymer are further controlled, the melt index of the thermoplastic resin composition may be further reduced.

Also, according to another embodiment of the present invention, provided is a thermoplastic resin molded article prepared from the above-described thermoplastic resin composition.

The thermoplastic resin molded article prepared from the thermoplastic resin composition according to the present invention not only has excellent impact resistance and transparency, but also has high environmental stress crack resistance (chemical resistance). Thus, the thermoplastic resin molded article may be suitable for a material simultaneously requiring excellent impact resistance, transparency, and environmental stress crack resistance (chemical resistance), particularly, the manufacture of medical products.

Hereinafter, the present invention will be described in more detail, according to specific examples and experimental examples. However, the following examples and experimental examples are merely presented to exemplify the present invention, and the scope of the present invention is not limited thereto.

Example 1

(1) Preparation of Methyl Methacrylate-Acrylonitrile-Butadiene-Styrene Copolymer (MABS)

(a) Small Diameter Conjugated Diene-Based Rubber Latex Core Preparation 110 parts by weight of ion exchange water, 100 parts by weight of 1,3-butadiene, 1.2 parts by weight of a rosin acid potassium salt and 1.5 parts by weight of an oleic acid potassium salt as an emulsifier, 0.1 part by weight of sodium carbonate and 0.5 part by weight of potassium bicarbonate as an electrolyte, and 0.3 part by weight of t-dodecyl mercaptan (TDDM) as a chain transfer agent were collectively added to a polymerization reactor (autoclave) filled with nitrogen, the reaction temperature was increased to 55° C. and 0.3 part by weight of potassium persulfate was collectively added as a polymerization initiator to initiate a reaction, and the reaction was continued for 10 hours. Thereafter, 0.05 part by weight of t-dodecyl mercaptan was further added as a chain transfer agent, the temperature was increased to 65° C. to further perform a reaction for 8 hours, and the reaction was then terminated. A conjugated diene-based rubber latex thus obtained had an average particle diameter of 1,000 Å, a gel content of 90 wt %, and a swelling index of 18. In this case, the average particle diameter, the gel content, and the swelling index were obtained by the above-described methods.

(b) Large Diameter Conjugated Diene-Based Rubber Latex Core Preparation

In order to prepare a large diameter conjugated diene-based rubber latex core from the small diameter conjugated diene-based rubber latex prepared in (a), 100 parts by weight of the small diameter conjugated diene-based rubber latex was added to a reactor, stirring speed and temperature was respectively set to 10 rpm and 30° C., 3.0 parts by weight of a 7% acetic acid aqueous solution was gradually added for 1 hour, the resultant mixture was then neutralized with a potassium hydroxide aqueous solution, and the stirring was stopped. Thereafter, the resultant product was left standing for 30 minutes to obtain a large diameter conjugated diene-based rubber latex core. The prepared large diameter conjugated diene-based rubber latex core had an average particle diameter of 3,000 Å, a gel content of 90 wt %, and a swelling index of 17. In this case, the average particle diameter, the gel content, and the swelling index were obtained by the above-described methods.

(c) Preparation of Shell 50 wt % of the large diameter conjugated diene-based rubber latex core prepared in (b), 90 parts by weight of ion exchange water, 0.1 part by weight of an alkyl aryl sulfonate salt (Dowfax™, Dow Chemical Company), 25 wt % of a monomer mixture constituting a shell, 0.1 part by weight of t-dodecyl mercaptan, 0.048 part by weight of tetrasodium pyrophosphate, 0.012 part by weight of dextrose, 0.001 part by weight of ferrous sulfide, and 0.04 part by weight of cumenhydroperoxide were collectively added to a polymerization reactor filled with nitrogen and having an internal temperature of 50° C., and a reaction was initiated while the temperature was increased to 73° C. for 1 hour. A mixed emulsion solution of 70 parts by weight of the ion exchange water, 0.2 part by weight of the alkyl aryl sulfonate salt, 25 wt % of the monomer mixture constituting the shell, 0.1 part by weight of the t-dodecyl mercaptan, 0.048 part by weight of the tetrasodium pyrophosphate, 0.012 part by weight of the dextrose, 0.001 part by weight of the ferrous sulfide, and 0.1 part by weight of the cumenhydroperoxide was continuously added to the reactor for 3 hours, the temperature was increased to 76° C. and aged for 1 hour, and the reaction was terminated to prepare a methyl methacrylate-acrylonitrile-butadiene-styrene copolymer having a polymerization conversion rate of 99% and a solid coagulum content of 0.1 wt %. Herein, the expression "part(s) by weight" is based on 100 parts by weight of a total of the conjugated diene-based rubber latex core and the monomer mixture constituting the shell, and the monomer mixture constituting the shell was prepared by mixing methyl methacrylate, styrene, and acrylonitrile in a weight ratio of 32.68:11.32:6.0. The prepared methyl methacrylate-acrylonitrile-butadiene-styrene copolymer was coagulated with a calcium chloride aqueous solution, washed, and then dried to obtain a methyl methacrylate-acrylonitrile-butadiene-styrene graft copolymer in a powder state.

(2) Preparation of Methyl Methacrylate-Styrene-Acrylonitrile Copolymer (MSAN)

30 parts by weight of toluene and 0.15 part by weight di-t-dodecyl mercaptan were added to 100 parts by weight of a monomer mixture including 68.4 wt % of methyl methacrylate, 26.6 wt % of styrene, and 5 wt % of acrylonitrile to prepare a raw material mixture, and the raw material mixture was continuously added to a reactor so as to allow an average reaction time of 3 hours. In this case, the reaction temperature was maintained at 148° C. A polymer solution discharged from the reactor was heated in a preheating tank and an unreacted monomer was vaporized in an evaporation tank to obtain a methyl methacrylate-styrene-acrylonitrile copolymer. The temperature of the copolymer was maintained at 210° C. and a polymer transfer pump extruder was used to prepare a methyl methacrylate-styrene-acrylonitrile copolymer in the form of pellets.

(3) Preparation of Thermoplastic Resin Composition 0.2 part by weight of a lubricant, 0.1 part by weight of an antioxidant, and 0.1 part by weight of an ultraviolet stabilizer were added to 100 parts by weight of a total amount of the two copolymers, i.e., the methyl methacrylate-acrylonitrile-butadiene-styrene graft copolymer prepared in (1) and the methyl methacrylate-styrene-acrylonitrile copolymer prepared in (2), and the mixture thus obtained was kneaded to prepare a thermoplastic resin composition in the form of a pellet using a twin screw extruder at 210° C. In this case, the methyl methacrylate-acrylonitrile-butadiene-styrene graft copolymer and the methyl methacrylate-styrene-acrylonitrile copolymer were used in a weight ratio of 58:42.

Example 2

A thermoplastic resin composition in the form of a pellet was obtained in the same manner as in Example 1 except that the methyl methacrylate-acrylonitrile-butadiene-styrene graft copolymer and the methyl methacrylate-styrene-acrylonitrile copolymer were used in a weight ratio of 48:52 instead of 58:42 in (3) of Example 1.

Example 3

A thermoplastic resin composition in the form of a pellet was obtained in the same manner as in Example 1 except that the total amount of the t-dodecyl mercaptan used in (1)-(c) of Example 1 was not 0.2 part by weight, but 0.05 part by weight which was added in two portions of 0.025 part by weight each.

Example 4

A thermoplastic resin composition in the form of a pellet was obtained in the same manner as in Example 1 except that the total amount of the t-dodecyl mercaptan used in (1)-(c) of Example 1 was not 0.2 part by weight, but 0.4 part by weight which was added in two portions of 0.2 part by weight each.

Example 5

A thermoplastic resin composition in the form of a pellet was obtained in the same manner as in Example 1 except that the monomer mixture constituting the shell in (1)-(c) of Example 1 was used by mixing methyl methacrylate, styrene, and acrylonitrile in a weight ratio of 35.66:12.34:2.0 and the total amount of the t-dodecyl mercaptan used was not 0.2 part by weight, but 0.3 part by weight which was added in two portions of 0.15 part by weight each.

Example 6

A thermoplastic resin composition in the form of a pellet was obtained in the same manner as in Example 1 except that the total amount of the t-dodecyl mercaptan used in (1)-(b) of Example 1 was not 0.2 part by weight, but 0.03 part by weight which was added in two portions.

Comparative Example 1

A thermoplastic resin composition in the form of a pellet was obtained in the same manner as in Example 1 except that the methyl methacrylate-acrylonitrile-butadiene-styrene graft copolymer and the methyl methacrylate-styrene-acrylonitrile copolymer were used in a weight ratio of 34:66 instead of 58:42 in (3) of Example 1.

Comparative Example 2

A thermoplastic resin composition in the form of a pellet was obtained in the same manner as in Example 1 except that the methyl methacrylate-acrylonitrile-butadiene-styrene graft copolymer and the methyl methacrylate-styrene-acrylonitrile copolymer were used in a weight ratio of 72:28 instead of 58:42 in (3) of Example 1.

Comparative Example 3

A thermoplastic resin composition in the form of a pellet was obtained in the same manner as in Example 1 except that the total amount of the t-dodecyl mercaptan used in (1)-(b) of Example 1 was not 0.2 part by weight, but 0.5 part by weight which was added in two portions of 0.25 part by weight each.

Comparative Example 4

A thermoplastic resin composition in the form of a pellet was obtained in the same manner as in Example 1 except that the monomer mixture constituting the shell in (1)-(c) of Example 1 was used by mixing methyl methacrylate, styrene, and acrylonitrile in a weight ratio of 28.23:15.77:6.0.

Comparative Example 5

A thermoplastic resin composition in the form of a pellet was obtained in the same manner as in Example 1 except that, in (1)-(c) of Example 1, the monomer mixture constituting the shell was used by mixing methyl methacrylate, styrene, and acrylonitrile in a weight ratio of 35.66:12.34:2.0 and the total amount of the t-dodecyl mercaptan used was not 0.2 part by weight, but 0.6 part by weight which was added in two portions of 0.3 part by weight each.

Comparative Example 6

A thermoplastic resin composition in the form of a pellet was obtained in the same manner as in Example 1 except that the total amount of the t-dodecyl mercaptan used in (1)-(c) of Example 1 was not 0.2 part by weight, but 0.5 part by weight which was added in two portions of 0.25 part by weight each, and the methyl methacrylate-acrylonitrile-butadiene-styrene graft copolymer and the methyl methacrylate-styrene-acrylonitrile copolymer were used in a weight ratio of 30:70 instead of 58:42 in (3) of Example 1.

Comparative Example 7

A thermoplastic resin composition in the form of a pellet was obtained in the same manner as in Example 1 except that a monomer mixture including 64 wt % of methyl methacrylate, 31 wt % of styrene, and 5 wt % of acrylonitrile was used instead of the monomer mixture used in the preparation of the methyl methacrylate-styrene-acrylonitrile copolymer (MSAN) in (2) of Example 1.

Comparative Example 8

A thermoplastic resin composition in the form of a pellet was obtained in the same manner as in Example 1 except that the methyl methacrylate-acrylonitrile-butadiene-styrene graft copolymer and the methyl methacrylate-styrene-acrylonitrile copolymer were used in a weight ratio of 39:61 instead of 58:42 in (3) of Example 1.

TABLE 1

| | MABS graft copolymer (A) | | Amount[1] of chain transfer | MSAN copolymer (B) | Amount[2] of chain transfer | Mixing |
|---|---|---|---|---|---|---|
| | Rubber content (wt %) | Weight ratio of MMA:S:AN | agent (part by weight) | Weight ratio of MMA:S:AN | agent (part by weight) | weight ratio of A:B |
| Example 1 | 28.9 | 32.68:11.32:6.0 | 0.2 | 68.4:26.6:5 | 0.1 | 58:42 |
| Example 2 | 28.9 | 32.68:11.32:6.0 | 0.2 | 68.4:26.6:5 | 0.1 | 48:52 |
| Example 3 | 28.9 | 32.68:11.32:6.0 | 0.05 | 68.4:26.6:5 | 0.1 | 58:42 |
| Example 4 | 28.9 | 32.68:11.32:6.0 | 0.4 | 68.4:26.6:5 | 0.1 | 58:42 |
| Example 5 | 28.9 | 35.66:12.34:2.0 | 0.3 | 68.4:26.6:5 | 0.1 | 58:42 |
| Example 6 | 28.9 | 32.68:11.32:6.0 | 0.03 | 68.4:26.6:5 | 0.1 | 58:42 |
| Comparative Example 1 | 16.9 | 32.68:11.32:6.0 | 0.2 | 68.4:26.6:5 | 0.1 | 34:66 |
| Comparative Example 2 | 35.9 | 32.68:11.32:6.0 | 0.2 | 68.4:26.6:5 | 0.1 | 72:28 |
| Comparative Example 3 | 28.9 | 32.68:11.32:6.0 | 0.5 | 68.4:26.6:5 | 0.1 | 58:42 |
| Comparative Example 4 | 28.9 | 28.23:15.77:6.0 | 0.2 | 68.4:26.6:5 | 0.1 | 58:42 |
| Comparative Example 5 | 28.9 | 35.66:12.34:2.0 | 0.6 | 68.4:26.6:5 | 0.1 | 58:42 |
| Comparative Example 6 | 14.9 | 32.68:11.32:6.0 | 0.5 | 68.4:26.6:5 | 0.1 | 30:70 |
| Comparative Example 7 | 28.9 | 32.68:11.32:6.0 | 0.2 | 64:31:5 | 0.1 | 58:42 |
| Comparative Example 8 | 19.5 | 32.68:11.32:6.0 | 0.2 | 68.4:26.6:5 | 0.1 | 39:61 |

In Table 1, the rubber content is a weight % based on the total weight of the thermoplastic resin composition, the amount[1] of the chain transfer agent is a relative weight ratio based on 100 parts by weight of the total sum of the conjugated diene-based rubber latex and the monomers grafted with the conjugated diene-based rubber latex, and the amount[2] of the chain transfer agent is a relative weight ratio based on 100 parts by weight of the total sum of the monomers constituting the MSAN copolymer.

Experimental Example 1

Refractive indices were measured for the copolymers prepared in Examples 1 to 6 and Comparative Examples 1 to 8.

The refractive index of the graft copolymer was calculated according to the following Equation 1 using the refractive index and amount of each polymer constituting the graft copolymer, 40 μm thick samples of the polymers constituting the copolymer were prepared, and the refractive indices of the polymers were then measured by irradiating the samples with light having a wavelength of 450 nm using an Abbe refractometer. The results thereof are presented in Table 2 below.

$$RI = \Sigma(Wti \times RIi) \qquad [\text{Equation 1}]$$

In Equation 1, Wti is a weight fraction (%) of each component (or polymer) in the graft copolymer, and RIi is the refractive index of the graft copolymer forming polymer.

TABLE 2

| | MABS graft copolymer (A) | | | | MSAN copolymer (B) | |
|---|---|---|---|---|---|---|
| | Refractive index of conjugated diene-based rubber latex core | Refractive index of shell | Refractive index of MABS graft copolymer | Solid coagulum content of MABS copolymer (wt %) | Refractive index of MSAN | Mw of MSAN (g/mol) |
| Example 1 | 1.518 | 1.518 | 1.518 | 0.10 | 1.518 | 146,000 |
| Example 2 | 1.518 | 1.518 | 1.518 | 0.10 | 1.518 | 146,000 |
| Example 3 | 1.518 | 1.518 | 1.518 | 0.14 | 1.518 | 146,000 |
| Example 4 | 1.518 | 1.518 | 1.518 | 0.09 | 1.518 | 146,000 |
| Example 5 | 1.518 | 1.518 | 1.518 | 0.08 | 1.518 | 146,000 |
| Example 6 | 1.518 | 1.518 | 1.518 | 0.18 | 1.518 | 146,000 |
| Comparative Example 1 | 1.518 | 1.518 | 1.518 | 0.10 | 1.518 | 146,000 |
| Comparative Example 2 | 1.518 | 1.518 | 1.518 | 0.10 | 1.518 | 146,000 |
| Comparative Example 3 | 1.518 | 1.518 | 1.518 | 0.08 | 1.518 | 146,000 |

TABLE 2-continued

| | MABS graft copolymer (A) | | | | MSAN copolymer (B) | |
|---|---|---|---|---|---|---|
| | Refractive index of conjugated diene-based rubber latex core | Refractive index of shell | Refractive index of MABS graft copolymer | Solid coagulum content of MABS (wt %) | Refractive index of MSAN | Mw of MSAN (g/mol) |
| Comparative Example 4 | 1.518 | 1.5249 | 1.5215 | 0.15 | 1.518 | 146,000 |
| Comparative Example 5 | 1.518 | 1.5158 | 1.5169 | 0.12 | 1.518 | 146,000 |
| Comparative Example 6 | 1.518 | 1.518 | 1.518 | 0.10 | 1.518 | 146,000 |
| Comparative Example 7 | 1.518 | 1.518 | 1.518 | 0.10 | 1.5224 | 145,000 |
| Comparative Example 8 | 1.518 | 1.518 | 1.518 | 0.10 | 1.518 | 146,000 |

Experimental Example 2

In order to analyze and compare impact resistances, transparencies, environmental stress crack resistances (chemical resistances), and fluidities of the thermoplastic resin compositions prepared in Examples 1 to 6 and Comparative Examples 1 to 8, impact strength, haze, environmental stress crack resistance, and melt index were respectively measured, and the results thereof are presented in Table 3 below.

(1) Impact Resistance

In order to analyze and compare the impact resistances of the thermoplastic resin compositions prepared in Examples 1 to 6 and Comparative Examples 1 to 8, the impact strength of each thermoplastic resin composition was measured.

The pellets of each thermoplastic resin composition were injection molded at 230° C. to prepare a ¼" thick sample, and the impact strength of the sample was measured in accordance with ASTM D256 (¼", notched at 2317, kgf·cm/cm$^2$).

(2) Melt Index (MI)

In order to analyze and compare the fluidities of the thermoplastic resin compositions prepared in Examples 1 to 6 and Comparative Examples 1 to 8, the flow index (melt index) of each thermoplastic resin composition was measured.

The melt index was determined by measuring a weight (g) of the resin in which the pellets of each resin composition were melted at a temperature of 220° C. for 10 minutes under a load of 10 kg in accordance with ASTM D1238.

(3) Environmental Stress Crack Resistance (Chemical Resistance)

In order to analyze and compare the environmental stress crack resistances (ESCR) of the thermoplastic resin compositions prepared in Examples 1 to 6 and Comparative Examples 1 to 8, the environmental stress crack resistance of each thermoplastic resin composition was measured.

The pellets of each thermoplastic resin composition were injection molded at 230° C. to prepare a ¼" thick sample, and the environmental stress crack resistance of each sample was measured in accordance with ASTM D1693, in which each sample was installed in a 1.5% strain jig at room temperature (about 25° C.) and left standing for 2 days after the center of the sample was soaked in soybean oil, and changes in the sample were observed after two days. From the observed results, the environmental stress crack resistance was evaluated according to the following criteria.

<Evaluation Criteria>

○: No change in the sample. Excellent environmental stress crack resistance

Δ: cracks were observed in the sample.

x: the sample was completely broken. Poor environmental stress crack resistance (4) Transparency (Haze)

In order to analyze and compare the transparencies of the thermoplastic resin compositions prepared in Examples 1 to 6 and Comparative Examples 1 to 8, the haze of each thermoplastic resin composition was measured.

The pellets of each thermoplastic resin composition were injection molded at 230° C. to prepare a ¼" thick sample, and the haze of each sample was measured in accordance with DIN 75201 method A after storing at room temperature (about 23° C.) for 24 hours.

TABLE 3

| Category | Impact strength (kgf · cm/cm$^2$) | Melt index (g/10 min) | Transparency (Haze, %) | Environmental stress crack resistance |
|---|---|---|---|---|
| Example 1 | 26.2 | 2.3 | 2.5 | ○ |
| Example 2 | 20.8 | 2.9 | 2.2 | ○ |
| Example 3 | 28.4 | 1.9 | 2.7 | ○ |
| Example 4 | 23.1 | 2.6 | 2.3 | ○ |
| Example 5 | 14.6 | 3.5 | 2.5 | ○ |
| Example 6 | 29.0 | 0.7 | 3.9 | ○ |
| Comparative Example 1 | 19.6 | 6.9 | 1.8 | x |
| Comparative Example 2 | 38.9 | 0.2 (poor tensile strength) | 4.5 | ○ |
| Comparative Example 3 | 24.2 | 4.1 | 2.2 | Δ |
| Comparative Example 4 | 25.5 | 2.5 | 9.8 | ○ |
| Comparative Example 5 | 15.5 | 6.5 | 2.7 | Δ |
| Comparative Example 6 | 18.0 | 20.6 | 1.8 | x |
| Comparative Example 7 | 25.0 | 2.6 | 11.5 | ○ |
| Comparative Example 8 | 21.5 | 5.4 | 2.0 | x |

From the experimental results, it was confirmed that the thermoplastic resin compositions of Examples 1 to 6 according to the present invention had a good balance between improvements in the impact resistance, melt index, transparency, and environmental stress crack resistance without being biased to any one in comparison to the thermoplastic resin compositions of Comparative Examples 1 to 8. However, with respect to Example 6 in which a relatively small amount of the chain transfer agent was used, since the melt index was significantly reduced in comparison to Examples 1 to 5, it had relatively deteriorated processability, and, also in terms of transparency, it had a high haze value in comparison to Examples 1 to 5.

Specifically, as a result of comparing the thermoplastic resin compositions of Examples 1 to 6, which were prepared by mixing the methyl methacrylate-acrylonitrile-butadiene-styrene graft copolymer (MABS) and the methyl methacrylate-styrene-acrylonitrile copolymer (MSAN) in the ratio range according to the present invention, and the thermoplastic resin compositions of Comparative Examples 1 and 2 which did not satisfy conditions of the rubber content and the mixing ratio of the MABS to the MSAN, although the thermoplastic resin of Comparative Example 1, in which the MSAN was excessively used, had excellent transparency, it had a melt index which was largely deviated from the melt index range of the thermoplastic resin composition suggested in the present invention, and thus, the environmental stress crack resistance was significantly reduced. Also, although the thermoplastic resin of Comparative Example 2, in which the MABS was excessively used, had excellent impact strength and environmental stress crack resistance, the transparency was significantly reduced and poor tensile strength was obtained.

Furthermore, the environmental stress crack resistances of the thermoplastic resins of Comparative Examples 3 and 5, in which the condition of the melt index of the thermoplastic resin composition suggested in the present invention was not only be satisfied, but the chain transfer agent was also used in an excessive amount, outside the range suggested in the present invention, during the preparation of the MABS, were reduced.

The transparency of the thermoplastic resin of Comparative Example 4, in which although the thermoplastic resin composition was prepared by mixing the MABS and the MSAN in the ratio range according to the present invention, the condition of the mixing ratio of the monomers constituting the MABS did not satisfy the condition of the mixing ratio limited in the present invention during the preparation of the MABS, was significantly reduced because the difference in the refractive indices of the MABS and the MSAN was greater than 0.003.

Also, the thermoplastic resin of Comparative Example 6, in which the condition of the melt index of the copolymer suggested in the present invention was not only satisfied, but the rubber content and the amount of the chain transfer agent were also respectively outside the ranges during the preparation of the MABS, had reduced impact strength and significantly reduced environmental stress crack resistance.

The transparency of the resin composition of Comparative Example 7, in which the condition of the mixing ratio of the monomers constituting the MSAN did not satisfy the condition of the mixing ratio limited in the present invention, was significantly reduced because the difference in the refractive indices of the MABS and the MSAN constituting the resin composition was greater than 0.003.

Furthermore, the environmental stress crack resistance of the resin composition of Comparative Example 8, in which the condition of the melt index of the copolymer suggested in the present invention was not only satisfied, but the condition of the rubber content in the thermoplastic resin composition was also not satisfied, was significantly reduced.

This indicated that the configuration and mixing ratio of each copolymer, the difference in the refractive indices between the two copolymers, and the adjustment of the melt index of the thermoplastic resin composition were important factors for improving all characteristics of the thermoplastic resin composition, such as impact strength, transparency, and environmental stress crack resistance, without being biased to any one characteristics. Therefore, the thermoplastic resin composition according to the present invention and the thermoplastic resin molded article prepared therefrom may be suitable for a material simultaneously requiring excellent impact resistance, transparency, and environmental stress crack resistance (chemical resistance), particularly, a material of medical products.

The invention claimed is:

1. A thermoplastic resin composition comprising a graft copolymer (A), in which a (meth)acrylic acid ester, a vinyl cyan-based compound, and an aromatic vinyl compound are graft polymerized with a conjugated diene-based rubber latex; and a copolymer (B) of a (meth)acrylic acid ester-aromatic vinyl compound-vinyl cyan-based compound in a weight ratio of 35:65 to 70:30, wherein solids of the conjugated diene-based rubber latex are included in an amount of 20 wt % to 35 wt % based on a total weight of the thermoplastic resin composition, wherein a difference in refractive indices of the graft copolymer (A) and the copolymer (B) of the (meth)acrylic acid ester-aromatic vinyl compound-vinyl cyan-based compound is less than 0.003 when irradiated with light having a wavelength of 450 nm to 680 nm, and wherein a melt index is 4.0 g/10 min or less when the melt index is measured at a temperature of 220° C. and under a load of 10 kg in accordance with ASTM D1238.

2. The thermoplastic resin composition of claim 1, wherein the conjugated diene-based rubber latex is a conjugated diene-based compound homopolymer, or a copolymer of a conjugated diene-based compound and an ethylene-based unsaturated compound.

3. The thermoplastic resin composition of claim 1, wherein the (meth)acrylic acid esters in the graft copolymer (A) and the copolymer (B) of the (meth)acrylic acid ester-aromatic vinyl compound-vinyl cyan-based compound, each independently comprise one selected from the group consisting of methyl acrylate, ethyl acrylate, propyl acrylate, butyl acrylate, hexyl acrylate, 2-ethylhexyl acrylate, methyl methacrylate, ethyl methacrylate, propyl methacrylate, butyl methacrylate, hexyl methacrylate, and 2-ethylhexyl methacrylate, or a mixture of two or more thereof.

4. The thermoplastic resin composition of claim 1, wherein the aromatic vinyl compounds in the graft copolymer (A) and the copolymer (B) of the (meth)acrylic acid ester-aromatic vinyl compound-vinyl cyan-based compound, each independently comprise one selected from the group consisting of styrene, α-methyl styrene, vinyl toluene, alkyl styrene substituted with a $C_{1-3}$ alkyl group, and halogen-substituted styrene, or a mixture of two or more thereof.

5. The thermoplastic resin composition of claim 1, wherein the vinyl cyan-based compounds in the graft copolymer (A) and the copolymer (B) of the (meth)acrylic acid ester-aromatic vinyl compound-vinyl cyan-based compound, each independently comprise one selected from the group consisting of acrylonitrile, methacrylonitrile, and derivatives thereof, or a mixture of two or more thereof.

6. The thermoplastic resin composition of claim 1, wherein the graft copolymer (A) has a core-shell structure comprising 45 wt % to 75 wt % of a conjugated diene-based rubber latex core; and 25 wt % to 55 wt % of a shell including the (meth)acrylic acid ester, the vinyl cyan-based compound, and the aromatic vinyl compound which are grafted onto the core.

7. The thermoplastic resin composition of claim 6, wherein a difference in refractive indices of the conjugated diene-based rubber latex core and the shell is less than 0.003.

8. The thermoplastic resin composition of claim 6, wherein the conjugated diene-based rubber latex core a gel content of 70 wt % to 95 wt %, and a swelling index of 12 to 30.

9. The thermoplastic resin composition of claim 1, wherein the graft copolymer (A) is prepared by graft polymerization of the (meth)acrylic acid ester, the vinyl cyan-based compound, and the aromatic vinyl compound with the conjugated diene-based rubber latex using a chain transfer agent,
wherein the (meth)acrylic acid ester, the vinyl cyan-based compound, and the aromatic vinyl compound are used in a weight ratio of 20:2:8 to 40:10:15, and
the chain transfer agent is used in an amount of 0.05 part by weight to 0.4 part by weight based on 100 parts by weight of a total sum of the solids of the conjugated diene-based rubber latex and monomers grafted with the conjugated diene-based rubber latex.

10. The thermoplastic resin composition of claim 9, wherein the chain transfer agent comprises one selected from the group consisting of n-butylmercaptan, n-octylmercaptan, n-dodecylmercaptan, and t-dodecylmercaptan, or a mixture of two or more thereof.

11. The thermoplastic resin composition of claim 1, wherein a solid coagulum content included in the graft copolymer (A) is less than 0.5 wt %.

12. The thermoplastic resin composition of claim 1, wherein the graft copolymer (A) includes a methyl methacrylate-acrylonitrile-butadiene-styrene copolymer.

13. The thermoplastic resin composition of claim 1, wherein the copolymer (B) of the (meth)acrylic acid ester-aromatic vinyl compound-vinyl cyan-based compound comprises:
55 wt % to 70 wt % of the (meth)acrylic acid ester;
20 wt % to 30 wt % of the aromatic vinyl compound; and
2 wt % to 10 wt % of the vinyl cyan-based compound.

14. The thermoplastic resin composition of claim 1, wherein the copolymer (B) of the (meth)acrylic acid ester-aromatic vinyl compound-vinyl cyan-based compound is a methyl methacrylate-styrene-acrylonitrile copolymer.

15. The thermoplastic resin composition of claim 1, wherein a haze measured in accordance with DIN 75201 method A is 2.5% or less.

16. A thermoplastic resin composition comprising a graft copolymer, in which methyl methacrylate, acrylonitrile, and styrene are graft polymerized with a conjugated diene-based rubber latex; and a methyl methacrylate-styrene-acrylonitrile copolymer in a weight ratio of 35:65 to 70:30,
wherein solids of the conjugated diene-based rubber latex are included in an amount of 20 wt % to 35 wt % based on a total weight of the thermoplastic resin composition,
a difference in refractive indices of the graft copolymer and the methyl methacrylate-styrene-acrylonitrile copolymer is less than 0.003 when irradiated with light having a wavelength of 450 nm to 680 nm,
the graft copolymer is prepared by graft polymerization of the methyl methacrylate, the acrylonitrile, and the styrene with the conjugated diene-based rubber latex using a chain transfer agent,
the methyl methacrylate, the acrylonitrile, and the styrene are used in a weight ratio of 20:2:8 to 40:10:15, and
the chain transfer agent is used in an amount of 0.05 part by weight to 0.4 part by weight based on 100 parts by weight of a total sum of the conjugated diene-based rubber latex and monomers grafted with the conjugated diene-based rubber latex.

17. A thermoplastic resin molded article prepared from the thermoplastic resin composition of claim 1.

18. The thermoplastic resin composition of claim 1, wherein the graft copolymer (A) and the copolymer (B) are present in a weight ratio of 48:52 to 58:42.

19. The thermoplastic resin composition of claim 16, wherein the graft copolymer (A) and the copolymer (B) are present in a weight ratio of 48:52 to 58:42.

* * * * *